United States Patent
Robertson et al.

(10) Patent No.: US 11,936,705 B2
(45) Date of Patent: Mar. 19, 2024

(54) SYSTEMS AND METHODS FOR PROVIDING AUDIO-VIDEO STREAMS WITH ALTERNATIVE CONTENT

(71) Applicant: MK Systems USA Inc., Wilmington, DE (US)

(72) Inventors: Mark W. Robertson, Lawrenceville, GA (US); Brian O'Neil, Denver, CO (US); Rabih Filfili, Milpitas, CA (US)

(73) Assignee: MK Systems USA Inc., Wilmington, DE (US)

( * ) Notice: Subject to any disclaimer, the term of this patent is extended or adjusted under 35 U.S.C. 154(b) by 0 days.

(21) Appl. No.: 17/333,068

(22) Filed: May 28, 2021

(65) Prior Publication Data

US 2021/0385264 A1    Dec. 9, 2021

Related U.S. Application Data

(60) Provisional application No. 63/034,577, filed on Jun. 4, 2020.

(51) Int. Cl.
    *H04L 29/06*      (2006.01)
    *H04L 65/65*      (2022.01)
    (Continued)

(52) U.S. Cl.
    CPC .............. *H04L 65/65* (2022.05); *H04L 65/75* (2022.05); *H04L 65/80* (2013.01);
    (Continued)

(58) Field of Classification Search
    CPC . H04L 65/605; H04L 65/4092; H04L 65/613; H04L 67/06; H04L 65/611;
    (Continued)

(56) References Cited

U.S. PATENT DOCUMENTS 10,097,451 B2 * 10/2018 Johns .................... H04L 65/752
10,555,023 B1    2/2020 McCarthy et al.
(Continued)

FOREIGN PATENT DOCUMENTS

WO    WO-2019110779 A1    6/2019

OTHER PUBLICATIONS

European Patent Office, Communication, Extended European Search Report issued for Patent Application No. 21175268.8, dated Aug. 11, 2021, 12 pages.
(Continued)

*Primary Examiner* — Dustin Nguyen
(74) *Attorney, Agent, or Firm* — Norton Rose Fulbright US LLP

(57) ABSTRACT

Systems, devices, and methods for providing alternative content in audio-video streams are disclosed. A manifest data structure including data reflective of a plurality of content segments is generated. At least one alternative content indicator, each indicating one of said plurality of content segments as being an alternative content segment is obtained. The manifest data structure is modified to remove data reflective of those of said plurality of content segments that are not indicated by said one of said alternative content indicators as being an alternative content segment. Upon receiving a request from a client device to view alternative content, the modified manifest data structure is sent to the client device.

20 Claims, 11 Drawing Sheets

(51) Int. Cl.
*H04L 65/75* (2022.01)
*H04L 65/80* (2022.01)
*H04N 21/2187* (2011.01)
*H04N 21/2662* (2011.01)
*H04N 21/845* (2011.01)

(52) U.S. Cl.
CPC ..... *H04N 21/2187* (2013.01); *H04N 21/2662* (2013.01); *H04N 21/8456* (2013.01)

(58) Field of Classification Search
CPC ..... H04L 67/101; H04L 65/752; H04L 67/52; H04N 21/8456; H04N 21/4524; H04N 21/44016; H04N 21/26258; H04N 5/91; H04N 9/8205; H04N 21/4325; H04N 21/4782; H04N 21/26225; H04N 21/458; H04N 21/8458; H04N 21/23106; H04N 21/64707; H04N 21/23439; H04N 21/234309; H04N 19/103; H04N 19/167; H04N 21/21805; G11B 27/005; G06F 16/748; G06F 16/41
See application file for complete search history.

(56) References Cited

U.S. PATENT DOCUMENTS

| | | | |
|---|---|---|---|
| 11,580,152 B1* | 2/2023 | Ramachandran | G06F 16/41 |
| 11,711,413 B2* | 7/2023 | Skupin | H04N 19/167 |
| 2005/0005308 A1* | 1/2005 | Logan | H04N 21/4782 |
| | | | 348/E7.071 |
| 2010/0235472 A1* | 9/2010 | Sood | H04L 67/06 |
| | | | 709/224 |
| 2010/0235528 A1* | 9/2010 | Bocharov | H04L 65/613 |
| | | | 709/248 |
| 2012/0198031 A1* | 8/2012 | Bouazizi | H04N 21/23439 |
| | | | 709/219 |
| 2014/0089465 A1* | 3/2014 | van Brandenburg | H04L 67/52 |
| | | | 709/217 |
| 2014/0150019 A1* | 5/2014 | Ma | H04N 21/458 |
| | | | 725/34 |
| 2014/0297883 A1* | 10/2014 | Srinivasan | H04L 65/4092 |
| | | | 709/231 |
| 2015/0172731 A1* | 6/2015 | Hasek | H04N 21/26258 |
| | | | 725/28 |
| 2015/0256577 A1* | 9/2015 | Gutierrez Vilaro | H04L 67/101 |
| | | | 709/203 |
| 2015/0256581 A1* | 9/2015 | Kolhi | H04N 21/4524 |
| | | | 709/219 |
| 2016/0134945 A1 | 5/2016 | Gower et al. | |
| 2016/0323606 A1* | 11/2016 | Mao | H04N 21/64707 |
| 2016/0358633 A1* | 12/2016 | Poral | H04N 9/8205 |
| 2017/0310722 A1* | 10/2017 | Chen | H04L 65/605 |
| 2017/0359628 A1* | 12/2017 | Sachdev | H04N 21/44016 |
| 2018/0199080 A1 | 7/2018 | Jackson, Jr. et al. | |
| 2018/0218757 A1* | 8/2018 | Natarajan | H04N 5/91 |
| 2018/0270287 A1* | 9/2018 | Ouedraogo | H04N 19/103 |
| 2018/0343482 A1 | 11/2018 | Loheide et al. | |
| 2019/0082233 A1* | 3/2019 | Love | H04N 21/21805 |
| 2019/0259424 A1* | 8/2019 | Lintz | G11B 27/005 |
| 2019/0327505 A1* | 10/2019 | Schwimmer | H04N 21/23106 |
| 2019/0342356 A1* | 11/2019 | Thomas | H04N 21/8458 |
| 2020/0053430 A1* | 2/2020 | Burke | G06F 16/748 |
| 2020/0099974 A1* | 3/2020 | Choi | H04N 21/26225 |
| 2020/0128297 A1* | 4/2020 | Weerasinghe | H04N 21/8456 |
| 2020/0186851 A1* | 6/2020 | Kahn | H04N 21/44016 |
| 2020/0213676 A1* | 7/2020 | Naik Raikar | H04N 21/4325 |
| 2020/0344510 A1* | 10/2020 | McMurray | H04N 21/234309 |
| 2020/0412785 A1* | 12/2020 | Loheide | H04L 65/611 |

OTHER PUBLICATIONS

European Patent Office, Summons to attend oral proceedings pursuant to Rule 115(1) EPC issued for European Patent Application No. 21175268.8, dated Jan. 11, 2024, 13 pages.

* cited by examiner

```
#EXTM3U
#EXT-X-VERSION:6
#EXT-X-INDEPENDENT-SEGMENTS
#EXT-X-STREAM-INF:BANDWIDTH=14316950,
AVERAGE-BANDWIDTH=6140508,
RESOLUTION=1920x1080,CODECS="avc1.4d4028,mp4a.40.2",
FRAME-RATE=29.970
vX-XXX-XXX.m3u8
```
— 302
— 304

```
#EXTM3U
#EXT-X-VERSION:3
#EXT-X-TARGETDURATION:3
#EXT-X-MEDIA-SEQUENCE:0
#EXT-X-PLAYLIST-TYPE:VOD
#EXT-X-START:TIME-OFFSET=0
#EXTINF:2.0020,
v7-0-121-1692-209432-221-167320-166192.ts
#EXTINF:2.0020,
v7-1-121-211124-152656-221-333512-166192.ts
#EXTINF:2.0020,
v7-2-121-363780-138368-221-499704-167132.ts
#EXTINF:2.0020,
v7-3-121-502148-164876-221-666836-165252.ts
#EXTINF:2.0020,
v7-4-121-667024-203416-221-832088-166192.ts
#EXTINF:2.0020,
v7-5-121-870440-166004-221-998280-166192.ts
#EXTINF:2.0020,
v7-6-121-1036444-144760-221-1164472-167132.ts
#EXTINF:2.0020,
v7-7-121-1181204-178036-221-1331604-166192.ts
#EXTINF:2.0020,
v7-8-121-1359240-156228-221-1497796-167132.ts
#EXTINF:2.0020,
v7-9-121-1515468-150776-221-1664928-164312.ts
#EXTINF:2.0020,
v7-10-121-1666244-172772-221-1829240-167132.ts
#EXTINF:2.0020,
v7-11-121-1839016-184992-221-1996372-166192.ts
#EXTINF:2.0020,
v7-12-121-2024008-159424-221-2162564-167132.ts
#EXTINF:2.0020,
v7-13-121-2183432-156416-221-2329696-166192.ts
#EXTINF:2.0020,
v7-14-121-2339848-157356-221-2495888-166192.ts
#EXT-X-ENDLIST
```

FIG. 3B

SYSTEMS AND METHODS FOR PROVIDING AUDIO-VIDEO STREAMS WITH ALTERNATIVE CONTENT

CROSS-REFERENCED TO RELATED APPLICATION

The present application claims the benefit of U.S. Provisional Application No. 63/034,577 filed Jun. 4, 2020 and entitled "SYSTEMS AND METHODS FOR PROVIDING AUDIO-VIDEO STREAMS WITH ALTERNATIVE CONTENT," the disclosure of which is incorporated by reference herein in its entirety.

FIELD

This disclosure relates to transmission of data, and more particularly relates to transmission of audio-video streams.

BACKGROUND

Over-the-top media services have grown in popularity. Such services deliver audio-video content to end users over the Internet (e.g., using HTTP), bypassing traditional cable, over-the-air, and satellite delivery channels.

Audio-video content may include, for example, a live broadcast of a sporting event. In this context, there is demand for alternative content such as highlights to supplement the live broadcast. Conventionally, audio-video streams of alternative content are made post production. For example, at the conclusion of a live broadcast, a recording of the source broadcast is edited using a linear editor and the alternative content is produced. However, the alternative content is not made available for consumption by end users until after conclusion of the live broadcast.

Accordingly, there is need for improved or alternate ways of providing such alternative content.

SUMMARY

In accordance with one aspect, there is provided a computer-implemented method for providing alternative content in audio-video streams. The method includes: generating a manifest data structure including data reflective of a plurality of content segments; obtaining at least one alternative content indicator, each indicating one of the plurality of content segments as being an alternative content segment; modifying the manifest data structure to remove data reflective of those of the plurality of content segments that are not indicated by the one of the alternative content indicators as being an alternative content segment; and upon receiving a request from a client device to view alternative content, sending the modified manifest data structure to the client device.

In accordance with another aspect, there is provided a computer-implemented system for providing alternative content in audio-video streams. The system includes: at least one processor; memory in communication with the at least one processor; and software code stored in the memory. The software code when executed at the at least one processor causes the system to: generate a manifest data structure including data reflective of a plurality of content segments; obtain at least one alternative content indicator, each indicating one of the plurality of content segments as being an alternative content segment; modify the manifest data structure to remove data reflective of those of the plurality of content segments that are not indicated by the one of the alternative content indicators as being an alternative content segment; and upon receiving a request from a client device to view alternative content, send the modified manifest data structure to the client device.

In accordance with a further aspect, there is provided a computer-implemented method for playing alternative content in audio-video streams. The method includes receiving, from a content system by way of a network, a first manifest data structure including data reflective of a plurality of content segments; initiating streaming of at least one of the plurality of content segments; receiving, from the content system, an indicator of availability of alternative content; sending, to the content system by way of the network, a request for the alternative content; receiving, from the content system by way of the network, a second manifest data structure containing a subset of the plurality of content segments which contain alternative content; and interrupting the streaming of the at least one the plurality content segments and initiating streaming of at least one of the subset of the plurality of content segments which contain alternative content.

In accordance with a yet further aspect, there is provided a computer-implemented system for playing alternative content in audio-video stream. The system includes: at least one processor; memory in communication with the at least one processor; and software code stored in the memory. The software code when executed at the at least one processor causes the system to receive, from a content system by way of a network, a first manifest data structure including data reflective of a plurality of content segments; initiate streaming of at least one of the plurality of content segments; receive, from the content system by way of the network, an indicator of availability of alternative content; send, to the content system by way of the network, a request for the alternative content; receive, from the content system by way of the network, a second manifest data structure containing a subset of the plurality of content segments which contain alternative content; and interrupt the streaming of the at least one the plurality content segments and initiating stream of at least one of the subset of the plurality of content segments which contain alternative content.

Many further features and combinations thereof concerning embodiments described herein will appear to those skilled in the art following a reading of the instant disclosure.

BRIEF DESCRIPTION OF THE DRAWINGS

In the figures,

FIG. 3A and FIG. 3B each shows an example manifest file, in accordance with an embodiment;

These drawings depict exemplary embodiments for illustrative purposes, and variations, alternative configurations, alternative components and modifications may be made to these exemplary embodiments.

DETAILED DESCRIPTION

Figure 1:
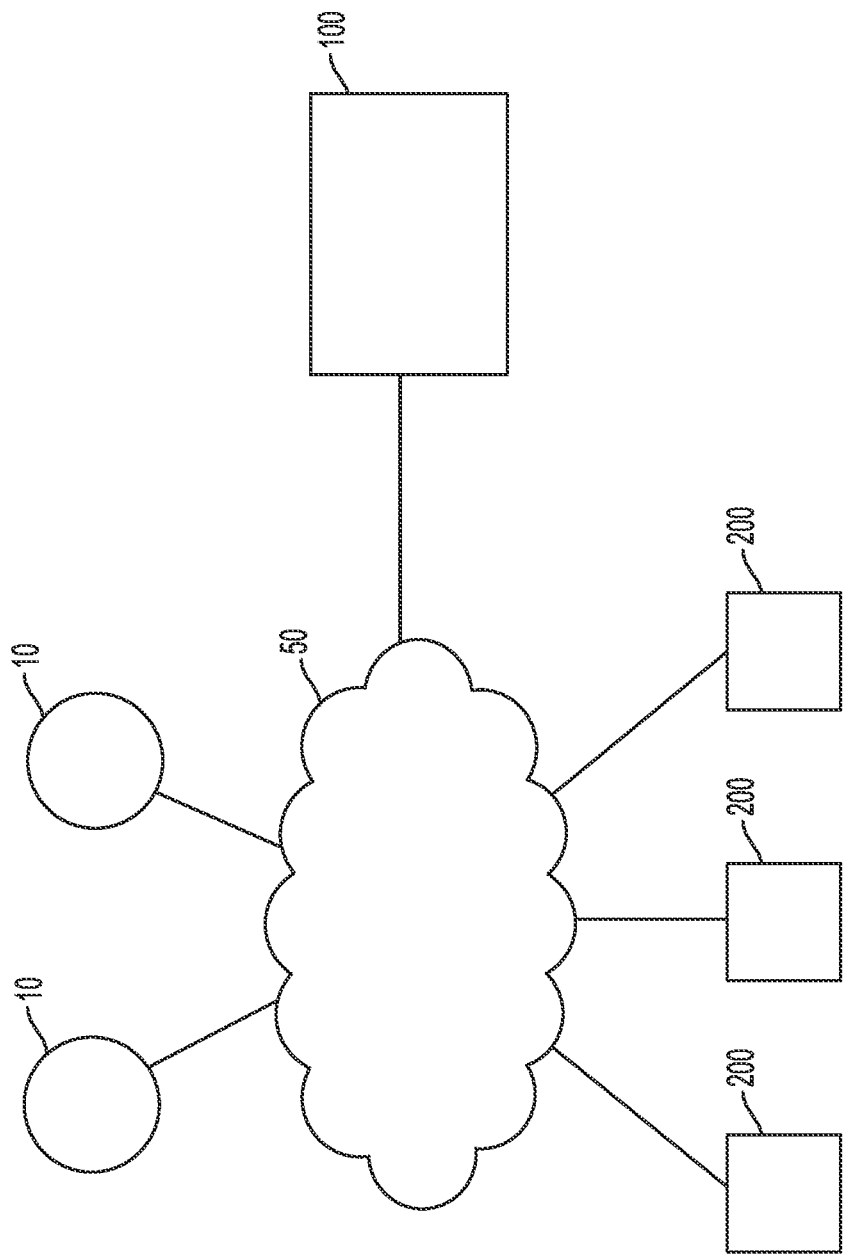
FIG. 1 is a network diagram of an over-the-top media service environment including a content streaming system, in accordance with an embodiment.

FIG. 1 is a network diagram for an example over-the-top (OTT) media service that delivers audio-video content to end users, in accordance with an embodiment. The OTT media service includes a content streaming system 100 that serves audio-video streams for consumption by end users. The audio-video streams include primary content streams, such as for a live broadcast, and also include alternative content streams, such as for highlights of the live broadcast in some embodiments. In some embodiments, such alternative content streams can be served before the end of the live broadcast.

As depicted, content streaming system 100 is interconnected with a plurality of content sources 10 and a plurality of client devices 200, by way of a communication network 50. Content streaming system 100 receives content from a content source 10 and processes the content to create alternative content in manners disclosed herein. Such alternative content is streamed to client devices 200 for consumption by end users.

In one example use case, an end user watching a live broadcast of a sporting event may request and receive alternative content corresponding to a highlights reel. After watching this alternative content, which is made available before the end of the live broadcast, the end user can resume watching the live broadcast.

In the depicted embodiment, each content source 10 may be a conventional source of audio-video content such as, for example, a television station or an Internet live stream. For example, a content source 10 may receive linear content by way of a satellite signal, a radio frequency (RF) antenna signal, or a dedicated portion of network 50. The received linear content is encoded by a plurality of encoders into multiple bitrates and multiple formats. As will be appreciated, for live broadcasts, encoding is performed in real time or near real time. Encoders may reside at a content source 10. For example, encoders may reside at a content source that is a local television station affiliate. Encoders may also be remote from a content source 10, and be connected therewith by network 50. Encoded content, in various bitrates and formats, is transmitted from the encoders to content streaming system 100. In some cases, encoded content may be transmitted to multiple recipients, e.g., by way of a multicast transmission.

Each client device 200 is a device operable by an end user to play streamed audio-video content. For example, a client device 200 may be a digital media player, a set-top box, a video game console, each connected to a display device for playing streamed content. A client device 200 may also be a SmartTV device or a personal computing device such as a laptop computer, a tablet computer or a smartphone, each having an integrated display screen. As detailed herein, each client device 200 include software adapting it to provide a user interface for alerting an end user when alternative content is available, and for requesting and displaying such alternative content.

Network 50 may include a packet-switched network portion, a circuit-switched network portion, or a combination thereof. Network 50 may include wired links, wireless links such as radio-frequency links or satellite links, or a combination thereof. Network 50 may include wired access points and wireless access points. Portions of network 50 could be, for example, an IPv4, IPv6, X.25, IPX or similar network. Portions of network 50 could be, for example, a GSM, GPRS, 3G, LTE or similar wireless networks. Network 50 may include or be connected to the Internet. When network 50 is a public network such as the public Internet, it may be secured as a virtual private network.

In the depicted embodiment, portions of network 50 interconnecting content streaming system 100 with client devices 200 are adapted for transmission of audio-video streams over HTTP. In other embodiments, other protocols may be used for transmission of audio-video streams.

Figure 2:
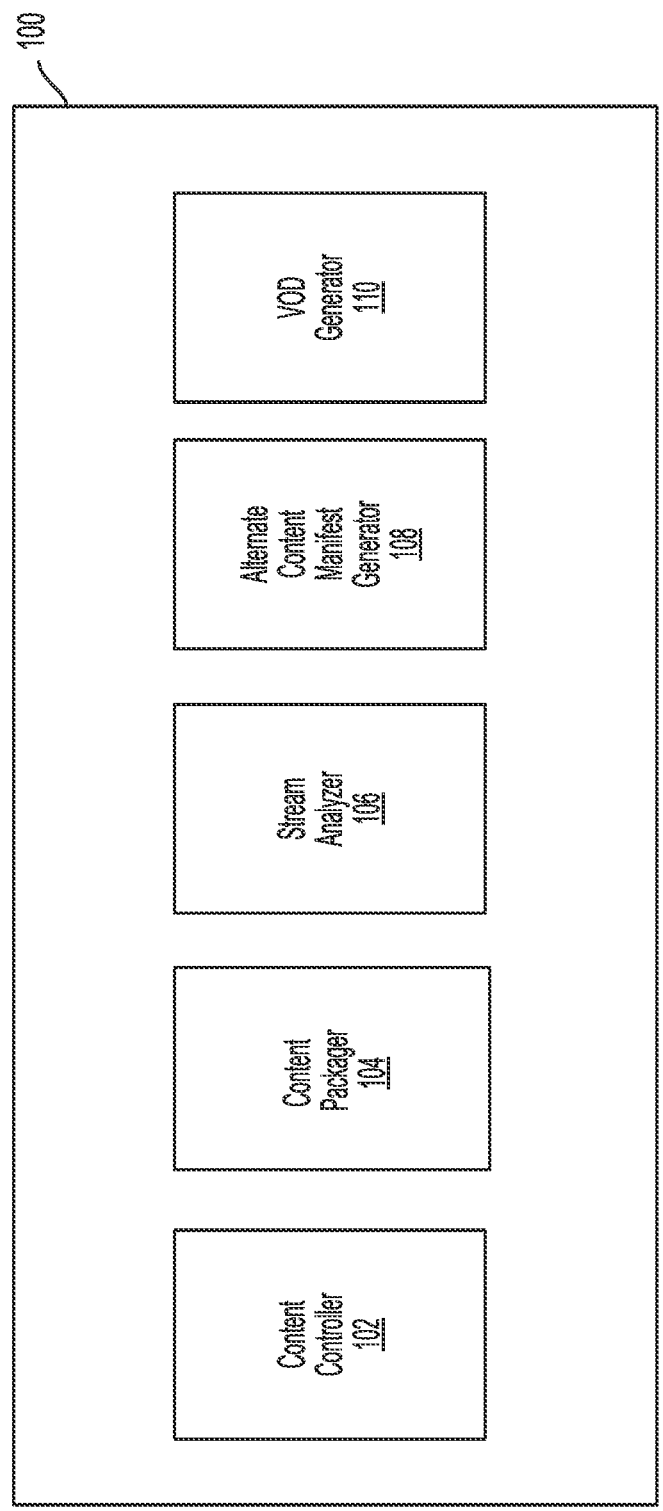
FIG. 2 is a schematic diagram of the content streaming system of FIG. 1, in accordance with an embodiment.

Content streaming system 100 may transmit audio-video content to a client device 200 using adaptive bitrate (ABR) streaming. ABR streaming may be implemented using HTTP Live Streaming (HLS), Microsoft HTTP Smooth Streaming (HSS), MPEG-DASH streaming, or the like FIG. 2 is a high-level schematic of content streaming system 100, in accordance with an embodiment. As depicted, content streaming system 100 includes a content controller 102, a content packager 104, a stream analyzer 106, an alternative content manifest generator 108, and a VOD generator 90.

Content controller 102 controls the delivery of content to one or more client devices 200. Content controller 102 authenticates a client device 200, and establishes a secure communication channel between content streaming system 100 and client device 200 for transmission of audio-video. Establishing this secure communication channel may include, for example, transmitting cryptographic keys effective for a particular session. Content controller 102 controls provisioning of resources at system 100 for servicing client device 200 for the duration of a session, e.g., so long as client device 200 transmits periodic keep-alive signals to content controller 102. Content controller 102 causes such resources to be released at the end of a session.

Content controller 102 receives requests for content from client devices 200. In response to each such request, content controller 102 transmits to client device 200 an URL of a content manifest file, such as an ABR manifest file.

Content controller 102 transmits a notification signal to client device 200 when alternative content is available at system 100 for streaming to a client device 200.

Content packager 104 receives primary content, e.g., from one or more content sources 10. The primary content may include content encoded in a plurality of bitrates and formats. Content packager 104 generates a primary manifest data structure that includes data describing content available at system 100 for access by client devices 200. For example, the manifest data structure may describe available content segments, each segment pertaining to a portion of content separately available for access and subsequent playback at a client device 200. Content packager 104 also generates the segments files referenced in the primary manifest data structure in a format suitable for client device 200, e.g., HLS, HSS, MPEG-DASH, or the like. Optionally, content packager 104 may encrypt the segment files, e.g., using a session key provided by content controller 102.

In the depicted embodiment, the primary manifest data structure includes one or more manifest files. FIG. 3A and FIG. 3B show example manifest files in HLS format. In particular, FIG. 3A shows the contents of a master manifest file 300. As shown, this file includes metadata descriptive of the stream including, e.g., metadata describing the stream bandwidth, resolution, codecs used, and framerate. This file also includes a reference 304 to a second manifest file 310 named "vX-XXX-XXX.m3u8". FIG. 3B shows the contents of second manifest file 310. As shown, second manifest file 310 includes line entries for a plurality of segments 312. The second manifest file 310 identifies the content type. In this case, the #EXT-X-PLAYLIST-TYPE identifies the content type to be "VOD", which represents video-on-demand content. For a live broadcast, the content type would be "EVENT", for example.

In other embodiments, the manifest may be provided in another format, e.g., as appropriate for other ABR streaming implementations such as HLS, HSS, MPEG-DASH streaming, or the like.

In some embodiments, content packager 104 generates the manifest file and referenced segment files in a just-in-time manner, e.g., responsive to a request from a client device 200 or as new content segments become available. In such embodiments, content packager 104 may be referred to as a just-in-time (JIT) packager.

In the depicted embodiment, stream analyzer 106 processes the live stream data to identify content segments that contain alternative content. Alternative content segments may be identified in various ways. In one example, stream analyzer 106 processes the audio portion of an audio-video stream to analyze crowd reactions, e.g., elevated crowd noise level in response to a scoring play. In another example, stream analyzer 106 processes audio data of an audio-video stream to detect words such as "Goal", "Penalty", "Overtime", or the like.

In some embodiments, stream analyzer 106 processes data from a social media platform, which may be collected by way of an application programming interface of the platform or by scraping data from the platform. Stream analyzer 106 may process such social media data to detect spikes in the number of posts, to detect excitement based on sentiment analysis of social media, and/or to detect social media voting for popular alternative content segments. Timestamps from social media posts are cross-referenced to timestamps in content streamed by system 100 to facilitate identification of alternative content segments.

Figure 4:
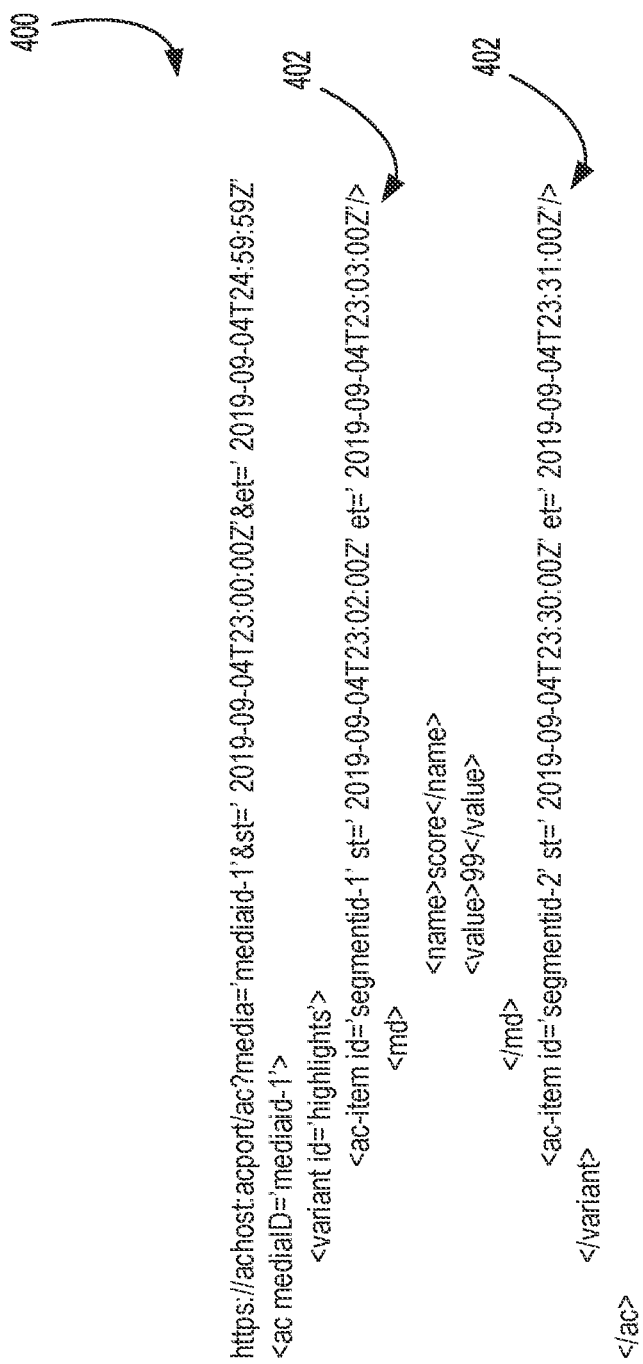
FIG. 4 shows an example XML file including identifiers of alternative content segments, in accordance with an embodiment.

Upon identifying content segments that contain alternative content, stream analyzer 106 generates an alternative content data structure that includes data identifying alternative content segments. In the depicted embodiment, this data structure includes one or more XML files. FIG. 4 shows an example XML file 400 that includes two indicators 402, namely two "ac-item" XML tags. Each tag indicates a segment, identified by a start time and an end-time, as being an alternative content segment. As shown, the two alternative content segments are identified, namely, "segmentid-1" and "segmentid-2". In other embodiments, the alternative content data structure may be defined in a format other than XML; for example, the alternative content data structure may be defined using a format such as JSON, YAML, or the like.

As shown in FIG. 4, the alternative content data structure generated by stream analyzer 106 may also include metadata describing some or all of the alternative content segment. For example, as shown, XML file 402 includes scoring metadata that indicates that a score of 99 has been associated with segment "segmented-1". This score, may be used, for example, by client device 200 to filter for particularly highly scoring alternative content segments.

Alternative content manifest generator 108 generates an alternative content manifest data structure that includes data describing alternative content segments available at system 100 for access by client devices 200. Alternative content manifest generator 108 generates this alternative content manifest data structure by modifying the primary manifest data structure generated by content packager 104 so that it includes only entries for segments that have been identified as containing alternative content.

To this end, alternative content manifest generator 108 receives the manifest data structure generated by content packager 104 and receives the alternative content data structure generated by data analyzer 106. Alternative content manifest generator 108 generates the alternative content manifest data structure by modifying the primary manifest data structure to remove each entry for a segment that is not identified in the alternative content data structure as being an alternative content segment.

In some embodiments, alternative content manifest generator 108 generates an alternative content manifest data structure by personalizing the content for a particular viewer. In one example, the content can be personalized based on the particular viewer's preferences for alternative content. In another example, the content can be personalized to include advertising targeted to the particular viewer.

Figure 5:
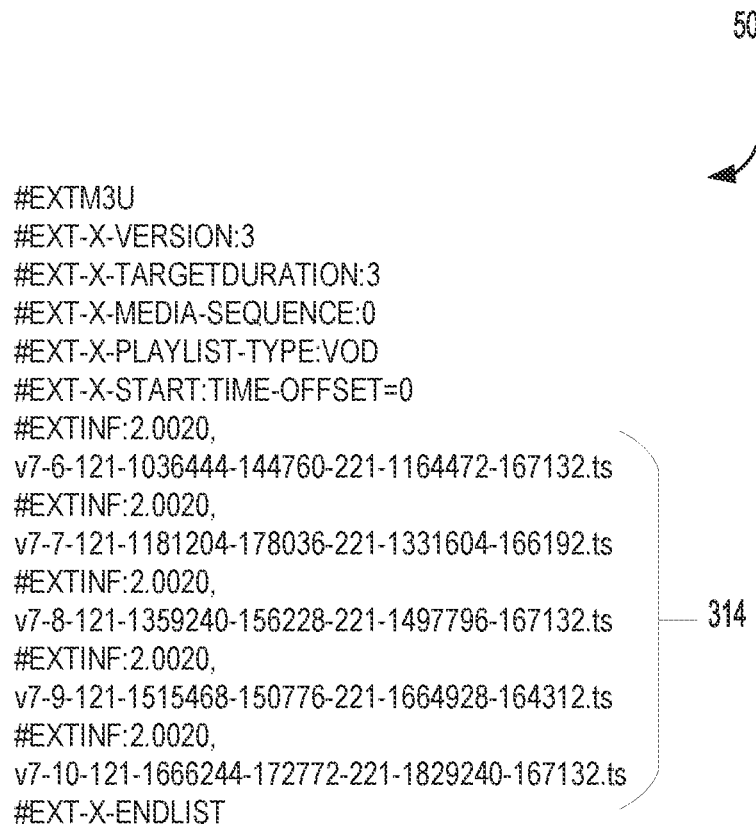
FIG. 5 shows an example alternative content manifest file, in accordance with an embodiment.

In the depicted embodiment, the alternative content manifest data structure includes a manifest file. FIG. 5 shows an example alternative content manifest file 500 in HLS format, which includes entries for a subset of the segments listed in FIG. 3B, namely, only alternative content segments 314.

VOD generator 110 generates a VOD asset including both primary content, e.g., the live broadcasted content and alternative content identified by stream analyzer 106. For example, the alternative content may be included as bonus content (e.g., a child asset) that supplements the primary content (e.g., a feature asset). VOD generator 100 may generate a VOD asset automatically upon conclusion of a live broadcast. VOD generator 100 may add an entry for the generated VOD asset in a VOD catalog accessible at client devices 200. Optionally, VOD generator 100 may flag the VOD asset for manual review before adding it to the VOD catalog. In one example, VOD generator 110 generates a VOD asset including a primary manifest data structure (e.g., including manifest files 300 and 310) and an alternative content manifest data structure (e.g., including manifest file 500).

Each of content controller 102, content packager 104, stream analyzer 106, alternative content manifest generator 108, and VOD generator 110 may be implemented using conventional programming languages such as Java, J #, C, C++, C #, Perl, Visual Basic, Ruby, Scala, etc. These components of system 100 may be in the form of one or more executable programs, scripts, routines, statically/dynamically linkable libraries, or the like.

Client device 200 includes a graphical user interface (GUI) with elements operable by an end user to request alternative content. For example, while an end user is streaming primary content (e.g., a live broadcast of a sporting event), the GUI may present on screen a graphical indicator indicating the availability of alternative content (e.g., highlights from the sporting event). The end user may activate the indicator (e.g., by a button press) to interrupt streaming of the primary content, and begin streaming the alternative content. After the alternative content has been streamed, client device 200 automatically resumes streaming the primary content. For example, the client device 200 may automatically resume streaming the live broadcast at the current time stamp.

Figure 6:
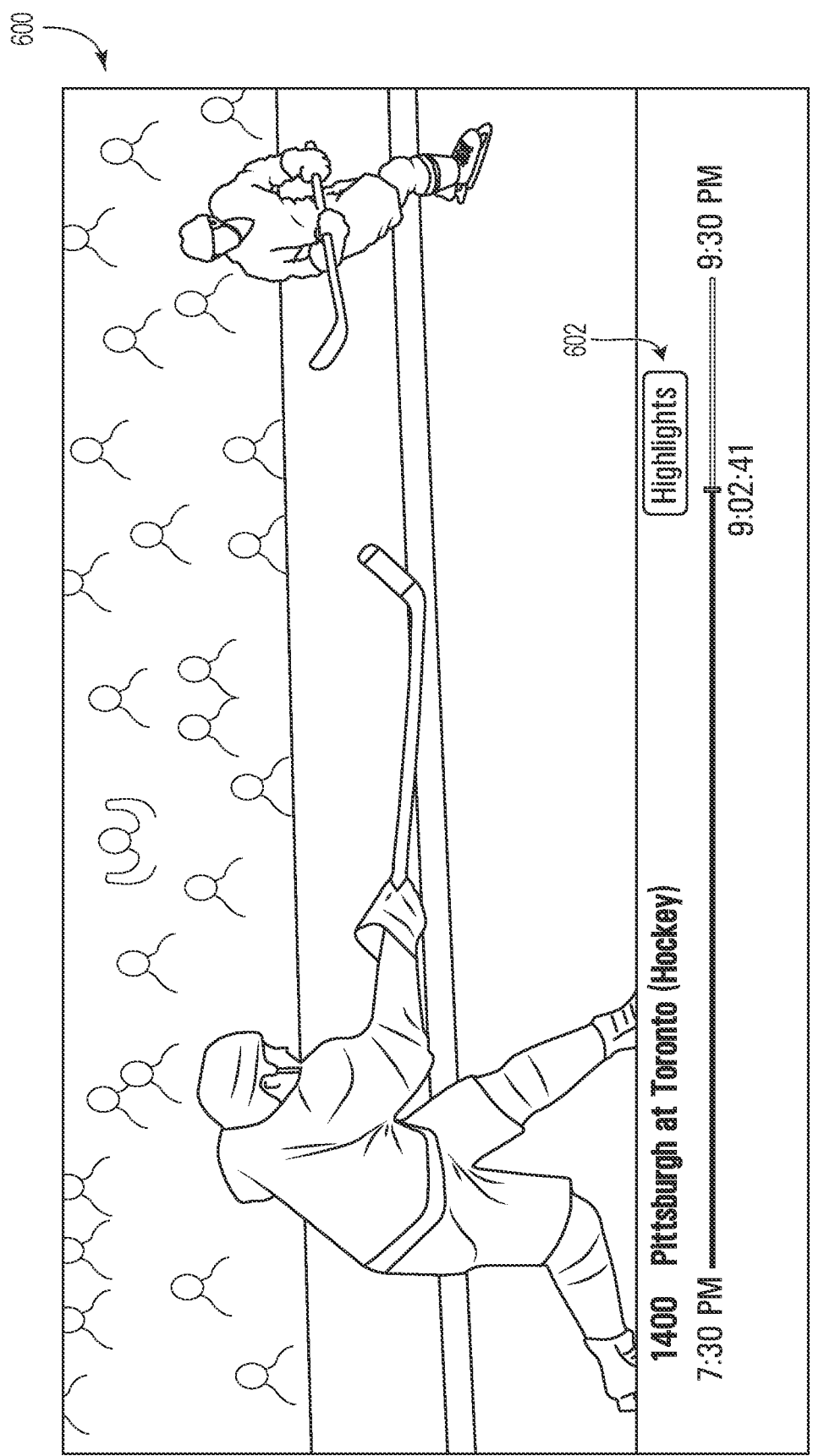
FIG. 6 is example screen displayed at a client device of FIG. 1, in accordance with an embodiment.

FIG. 6 shows an example screen 600 of the GUI presented at client device 200, in accordance with an embodiment. In this example, an end user is watching a live broadcast of a hockey game. Because the end user began streaming after the game started, he or she may have missed highlights such as scoring plays. Screen 600 includes a "highlights" button 602. The presence of button 602 indicates that alternative content in the form of highlights are available. Activation of button 602 by the end user causes client device 200 request an alternative content manifest from content streaming system 100, and then begin streaming of alternative content segments. Once the end user has viewed these alternative content segments and "caught up" with the hockey game, client device 200 resumes streaming of the live broadcast.

The operation of content streaming system 100 and client device 200 is further described with reference to example service flows depicted in FIG. 7 and example sequences of actions depicted in FIG. 8A and FIG. 8B.

Figure 7:
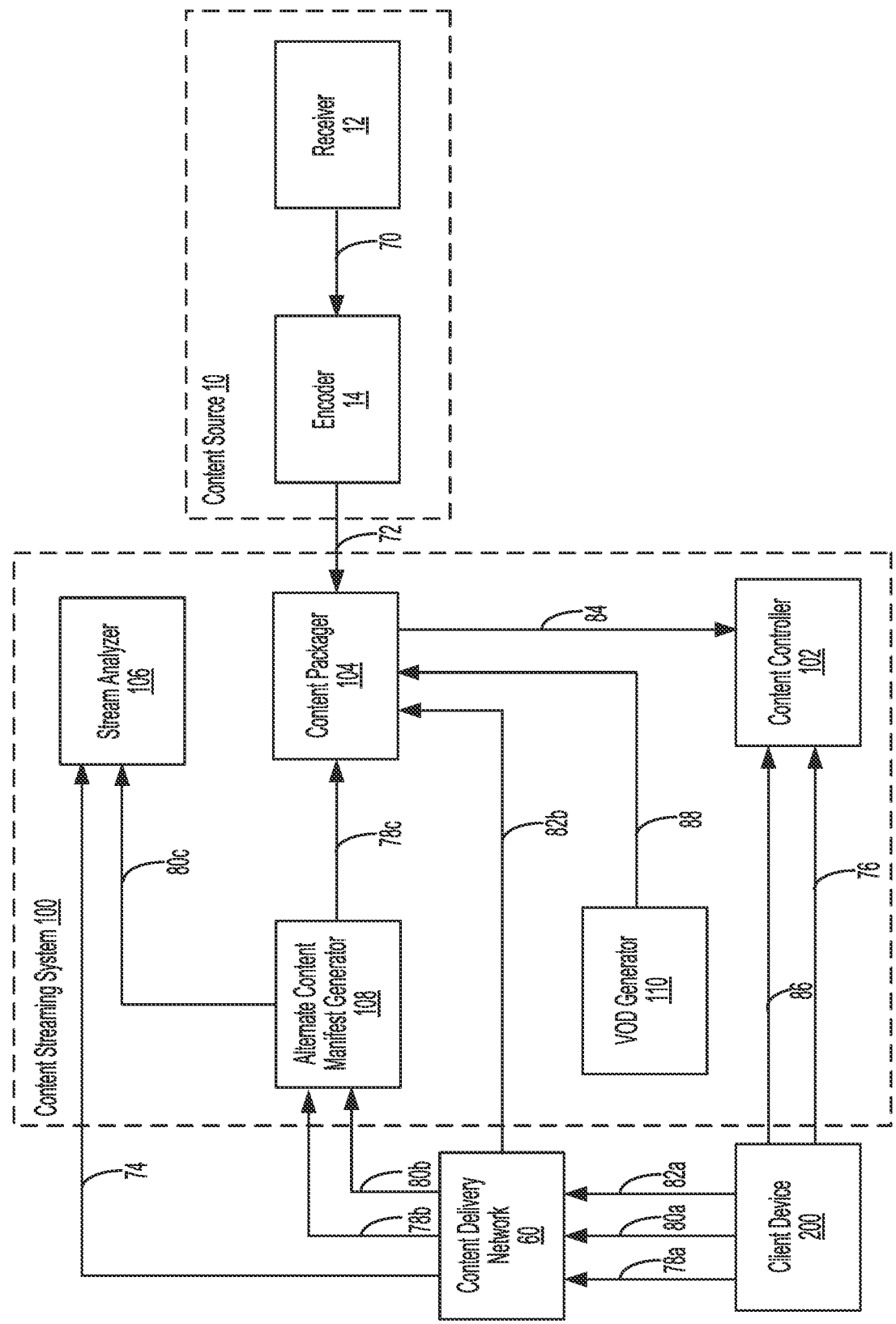
FIG. 7 is a service flow diagram for the content streaming system of FIG. 1, in accordance with an embodiment.

FIG. 7 is a service flow diagram for content streaming system 100 when streaming a live broadcast, in accordance with an embodiment. Flow begins at content source 10 where linear content is received at receiver 12 (arrow 70). The received content is encoded at encoders 14 and then transmitted to content packager 104 of content streaming system 100 (arrow 72). In the depicted embodiment, content packager 104 functions as the origin server of the ABR live stream.

Stream analyzer 106 acquires the live stream from content packager 104 (arrow 74) by way of content delivery network 60. In particular, stream analyzer 106 sends a request for a content manifest to content delivery network 60, which triggers a cache miss, and causes the request to be sent onward to alternative content manifest generator 108 and then content packager 104. Content delivery network 60 includes a distributed network of proxy servers and data caches interconnected by way of communication network 50 (FIG. 1). Stream analyzer 106 analyzes the acquired live stream to identify alternative content segments in manners disclosed herein.

Upon activation by an end user, client device 200 initiates a streaming session by way of a request to content controller 102 (arrow 76), which may be referred to as a "roll" request. Content controller 102 provides data to client device 200 regarding where to request the stream, e.g., where to request a manifest.

Client device 200 sends a manifest request to content delivery network 60 (arrow 78a) corresponding to a live broadcast of a particular channel, which triggers a cache miss, thereby causing the request to be sent onward to alternative content manifest generator 108 (arrow 78b). This triggers a further cache miss, thereby causing the request to be sent further onward to content packager 104 (arrow 78c). During operation, client device 200 requests and receives the manifest periodically, which changes as a live broadcast progresses and new segments become available.

Client device 200 is alerted to the availability of alternative content for the particular live broadcast by content controller 102. In response, client device 200 presents a button to the end user to request this alternative content. When the end user activates this button, client device 200 sends a new manifest request to content delivery network 60 (arrow 80a). Again, this triggers a cache miss, thereby causing the request to be sent onward to alternative content manifest generator 108 (arrow 80b). Alternative content manifest generator 108 requests alternative content segments from stream analyzer 106 (arrow 80c), which responds with at least one alternative content indicator.

Upon receipt of a manifest, whether containing primary content segments or alternative content segments, client device 200 requests the stream from content delivery network 60 (arrow 82a). When this triggers a cache miss, this causes the request to be sent onward to content packager 104 (arrow 82b). Content packager 104 requests an encryption key from content controller 102 for encrypting the segment (arrow 84), and periodically refreshes the encryption key from content controller 102. Content packager 104 streams the encrypted segment data to client device 200.

Client device 200 provides periodic beacon requests to content controller 102 (arrow 86).

VOD generator 110 generates a VOD asset including the primary content and the alternate content (arrow 88).

Figure 8A:
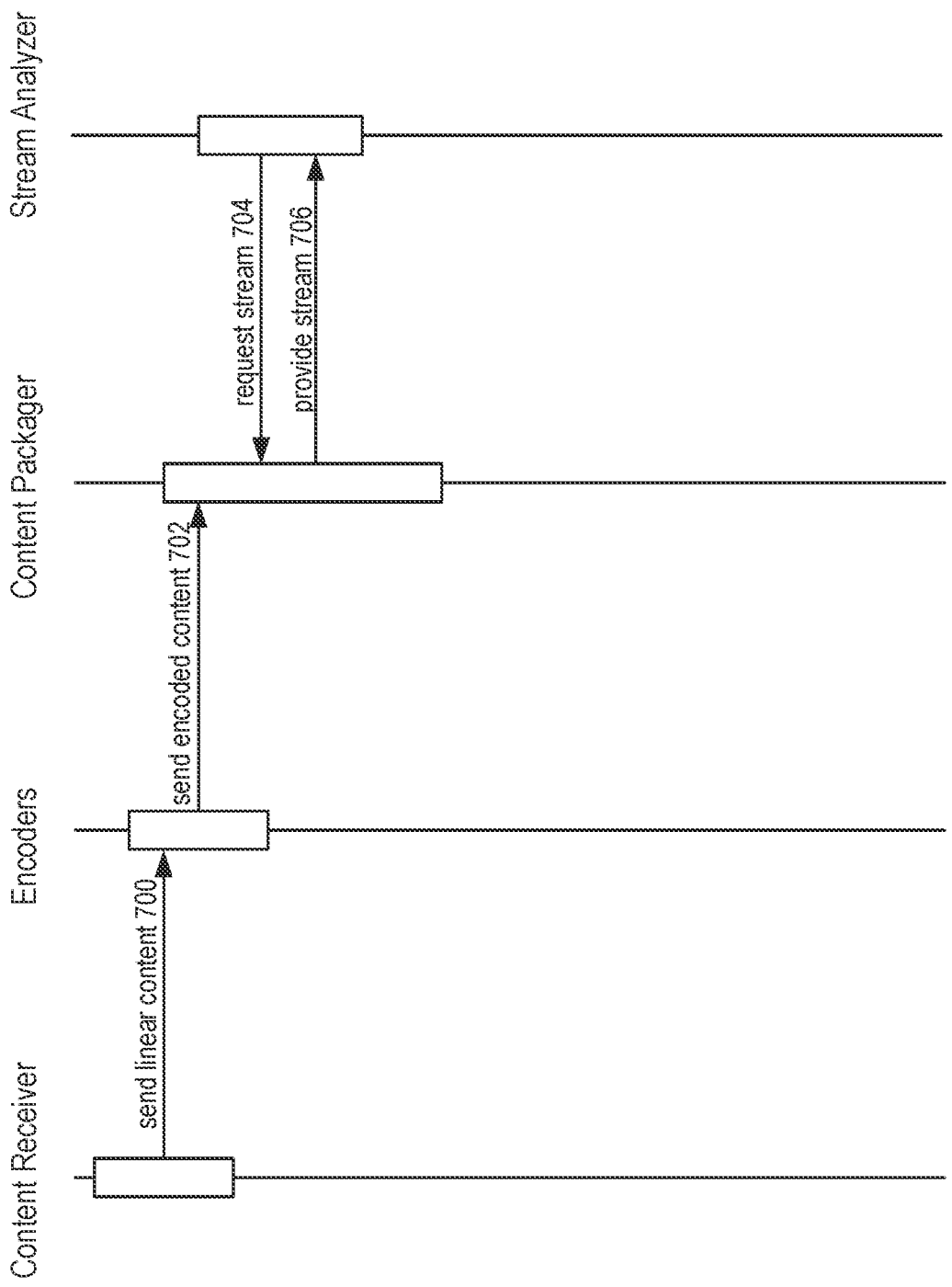
FIG. 8A is a sequence diagram for a content streaming system of FIG. 1, in accordance with an embodiment.

Referring to FIG. 8A, at content source 10, a content receiver receives linear content and provides the received linear content to a plurality of encoders (action 700). The plurality of encoders encode the linear content into various formats and bitrates and then sends the encoded content to content packager 104 (action 702). Content packager 104 generates a manifest data structure including data reflective of a plurality of content segments, e.g., an ABR manifest. Thereafter, stream analyzer 106 requests the manifest data from content packager 104 (action 704), and content packager 104 provides the manifest data (action 706). Stream analyzer 106 analyses stream data to generate at least one alternative content indicator, each indicating one of the plurality of content segments as being an alternative content segment.

Figure 8B:
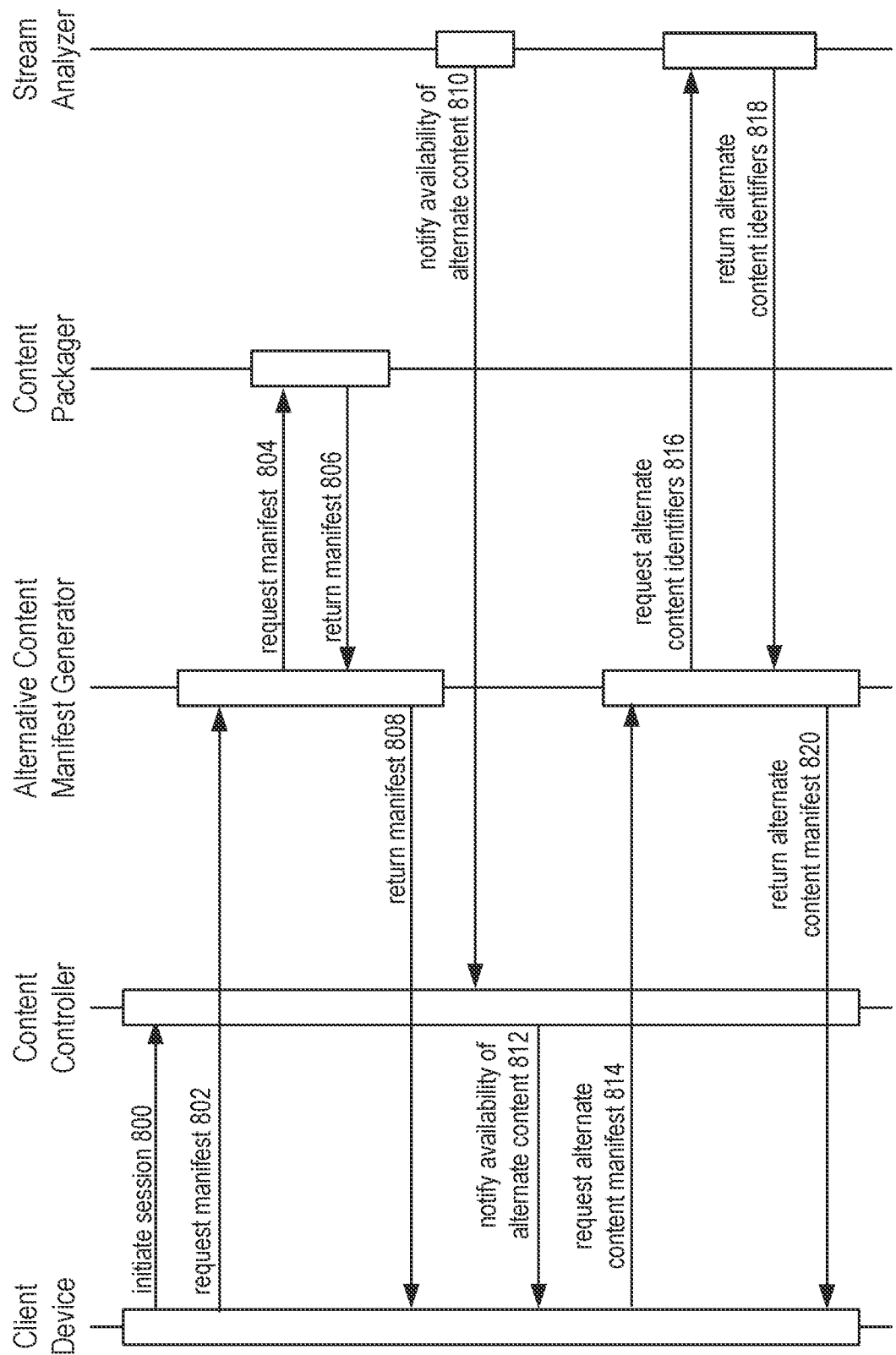
FIG. 8B is a sequence diagram for a content streaming system and a client device of FIG. 1, in accordance with an embodiment.

Referring to FIG. 8B, client device 200 initiates a streaming session, e.g., by presenting a device identifier to content controller 102 (action 800). Then, client device 200 sends a request for a primary content manifest from content streaming system 100 (action 802), e.g., to tune into the live broadcast. This content manifest request is received by alternative content manifest generator 108, which passes the request to content packager 104 (action 804). Content packager 104 provides a manifest data structure including data reflective of a plurality of content segments to alternative content manifest generator 108 (action 806), which relays it to client device 200 (action 808). Client device 200 processes this manifest data structure to initiate streaming of a segment.

Stream analyzer 106, upon determining that there is alternative content, sends an indicator of availability of alternative content to notify content controller 102 (action 810). In turn, content controller 102 sends an indicator of availability of alternative content to notify client device 200 (action 812). In response, client device 200 presents, on a screen for displaying streamed content, a graphical indicator indicating the availability of alternative content (FIG. 6). In response to receiving user input reflective of a request for alternative content, client device 200 sends a request for alternative content to alternative content manifest generator 108 (action 814). In an embodiment, the form of this request may be the same as a request for primary content (e.g., a live broadcast), but may additionally include a flag such as "highlights=true". In other embodiments, the flag varies depending on the type of alternative content identified by stream analyzer 106. For example, there may be a flag such as "mature subject matter=true" to indicate the existence of alternative content that is mature subject matter. In some embodiments, there may be multiple flags if stream analyzer 106 identifies multiple types of alternative content.

Alternative content manifest generator 108 requests from stream analyzer 106 at least one alternative content indicator, each indicating one of the plurality of content segments as being an alternative content segment (action 816). If any alternative content has been identified, alternative content manifest generator 108 obtains the at least one alternative content indicator from stream analyzer 106 (block 818). When at least one alternative content indicator is received, alternative content manifest generator 108 modifies the primary manifest data structure to remove data reflective of those of the plurality of content segments that are not indicated by one of the alternative content indicators as being an alternative content segment. Alternative content manifest generator 108 then sends the modified manifest data structure to client device 200 (action 820).

Upon receiving the modified manifest data structure, client device 200 interrupts streaming of a primary content segments and initiates streaming one of the plurality of content segments which contain alternative content. When streaming the alternative content segments concludes, client device 200 automatically resumes streaming a primary content segment (e.g., the live broadcast).

Alternative Content

Embodiments have been described above with reference to alternative content corresponding to highlights of a live sporting event. However, alternative content may correspond to any portion of content that is of particular interest to an end user, which may vary across users and across content types. For example, alternative content may correspond to all portions featuring a particular person (such as a particular athlete), or all portions containing product placements. In another example, alternative content may correspond to all portions containing mature subject matter (e.g., strong language, violence, nudity, drug use, or the like). Such selection of alternative content may be used, for example, by parents or rating agencies to review and screen content. In some embodiments, stream analyzer 106 may be configured to identify multiple types of alternative content.

More generally, alternative content may correspond to any content identified as being likely of particular interest to a viewer based on pre-defined criteria.

On-Demand Content

Embodiments have been described above with reference to a live broadcast example. However, alternative content streams may also be provided for on-demand content such as, for example, movies, music videos, or content stored in a Cloud DVR system. For such content, stream analyzer 108 may identify alternative content corresponding to best scenes, or scenes featuring a particular actor or actress. In some embodiments, content streaming system 100 may include a content management system that distributes on-demand content to content packager 104 and stream analyzer 106 for processing.

Figure 9:
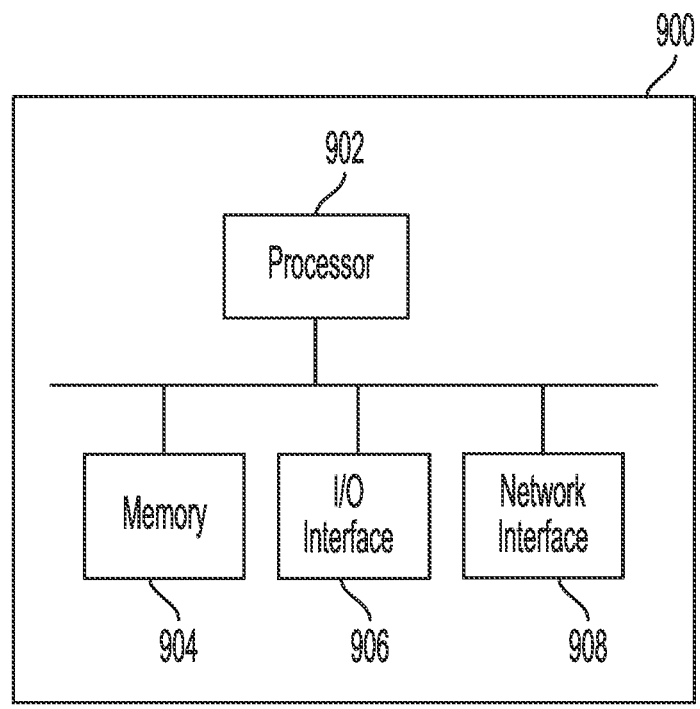
FIG. 9 is a schematic diagram for a computing device, in accordance with an embodiment.

FIG. 9 is a schematic diagram of computing device 900 which may be used to implement content streaming system 100, in accordance with an embodiment.

As depicted, computing device 900 includes at least one processor 902, memory 904, at least one I/O interface 906, and at least one network interface 908.

Each processor 902 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 904 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 906 enables computing device 900 to interconnect with one or more input devices, such as a keyboard, mouse, camera, touch screen and a microphone, or with one or more output devices such as a display screen and a speaker.

Each network interface 908 enables computing device 900 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

For simplicity only, one computing device 900 is shown but system 1000 may include multiple computing devices 900. The computing devices 900 may be the same or different types of devices. The computing devices 900 may be connected in various ways including directly coupled, indirectly coupled via a network, and distributed over a wide geographic area and connected via a network (which may be referred to as "cloud computing").

For example, and without limitation, a computing device 900 may be a server, network appliance, set-top box, embedded device, computer expansion module, personal computer, laptop, personal data assistant, cellular telephone, smartphone device, UMPC tablets, video display terminal, gaming console, or any other computing device capable of being configured to carry out the methods described herein.

In some embodiments, a computing device 900 may function as a client device 200.

The foregoing discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Of course, the above described embodiments are intended to be illustrative only and in no way limiting. The described embodiments are susceptible to many modifications of form, arrangement of parts, details and order of operation. The disclosure is intended to encompass all such modification within its scope, as defined by the claims.

What is claimed is:

1. A computer-implemented method for providing alternative content in audio-video streams, said method comprising:
    generating a manifest data structure containing a plurality of data entries identifying a plurality of content segments of an audio-video stream;
    obtaining at least one alternative content indicator, each corresponding to and indicating one of said plurality of content segments as being an alternative content segment of one or more alternative content segments, wherein said one or more alternative content segments are a subset of said plurality of content segments corresponding to one or more portions of a program, wherein the one or more portions are of particular interest to an end user;
    modifying said manifest data structure to remove at least one of said data entries from said manifest data structure, said at least one of said data entries identifying those of said plurality of content segments that are not indicated by said one of said alternative content indicators as being an alternative content segment so that those of said data entries identifying those of said plurality of content segments corresponding to said one or more portions of said program of particular interest to said end user are retained in said manifest data structure; and
    upon receiving a request from a client device to view alternative content during streaming of at least one of said plurality of content segments of said audio-video stream, sending said modified manifest data structure to the client device to initiate streaming of at least one of the content segments present in an unmodified manifest data structure and retained in said modified manifest data structure.

2. The computer-implemented method of claim 1, wherein said audio-video stream includes live broadcast content.

3. The computer-implemented method of claim 1, wherein said audio-video stream is an adaptive bitrate stream.

4. The computer-implemented method of claim 1, wherein said alternative content segments comprise highlights content.

5. The computer-implemented method of claim 1, wherein said alternative content segments comprise mature subject matter content.

6. The computer-implemented method of claim 1, wherein said one or more alternative content segments comprise content identified as being likely of particular interest to a viewer based on pre-defined criteria.

7. The computer-implemented method of claim 1, wherein said modifying said manifest data structure comprises generating an alternative content identification data structure upon said obtaining said at least one alternative content indicator, wherein said alternative content identification data structure comprises data reflective of said one or more alternative content segments, and wherein said modified manifest data structure comprises said alternative content identification data structure.

8. The computer-implemented method of claim 1, further comprising generating a VOD asset including said one or more alternative content segments.

9. The computer-implemented method of claim 1, wherein said obtaining at least one alternative content indicator includes obtaining an XML, file defining said at least one alternative content indicator.

10. The computer-implemented method of claim 1, wherein said obtaining at least one alternative content indicator comprises generating said at least one alternative content indicator by processing said plurality of content segments to identify said corresponding alternative content segment.

11. A computer-implemented system for providing alternative content in audio-video streams, said system comprising:
    at least one processor;
    memory in communication with said at least one processor;
    software code stored in said memory, which when executed at one or more processors of said at least one processor causes the system to:
        generate a manifest data structure containing a plurality of data entries identifying a plurality of content segments;
        obtain at least one alternative content indicator, each indicating one of said plurality of content segments as being an alternative content segment of an audio-video stream, wherein said one or more alternative content segments are a subset of said plurality of content segments corresponding to one or more portions of a program, wherein the one or more portions are of particular interest to an end user;
        modify said manifest data structure to remove at least one of said data entries from said manifest data structure, said at least one of said data entries identifying those of said plurality of content segments that are not indicated by said at least one alternative content indicators as being an alternative content segment so that those of said data entries identifying those of said plurality of content segments corresponding to said one or more portions of said program of particular interest to said end user are retained in said manifest data structure; and upon receiving a request from a client device to view alternative content during streaming of at least one of said plurality of content segments of said audio-video stream, send said modified manifest data structure to the client device to initiate streaming of at least one of the content segments present in an unmodified manifest data structure and retained in said modified manifest data structure.

12. The computer-implemented system of claim 11, wherein said audio-video stream includes live broadcast content.

13. The computer-implemented system of claim 11, wherein said alternative content segments comprise highlights content.

14. A computer-implemented method for playing alternative content in audio-video streams, said method comprising:

receiving, from a content system by way of a network, a first manifest data structure containing a plurality of data entries identifying a plurality of content segments of an audio-video stream;

initiating streaming of at least one of said plurality of content segments of said audio-video stream;

receiving, from said content system, an indicator of availability of alternative content corresponding to one or more portions of a program, wherein the one or more portions are of particular interest to an end user;

sending, to said content system by way of said network, a request for said alternative content during said streaming of said at least one of said plurality of content segments of said audio-video stream;

receiving, from said content system by way of said network, a second manifest data structure reflective of removal from said first manifest data structure at least one of said data entries identifying those of said plurality of content segments that are not indicated by said one of said alternative content indicators as being an alternative content segment, the second manifest data structure retaining those of said data entries identifying a subset of said plurality of content segments which contain alternative content corresponding to said portions of said program of particular interest to said end user; and interrupting said streaming of said at least one said plurality content segments and initiating streaming of at least one of said subset of said plurality of content segments which contain alternative content present in an unmodified manifest data structure and retained in said modified manifest data structure.

15. The computer-implemented method of claim 14, further comprising:

resuming streaming of said at least one of said plurality of content segments.

16. The computer-implemented method of claim 15, wherein said resuming streaming includes resuming streaming at a current time stamp.

17. The computer-implemented method of claim 14, further comprising:

presenting, on a screen for displaying streamed content, a graphical indicator indicating availability of alternative content.

18. The computer-implemented method of claim 14, further comprising:

receiving user input reflective of a request for said alternative content.

19. The computer-implemented method of claim 14, wherein said streaming of at least one of said plurality of content segments is implemented using adaptive bitrate streaming.

20. A computer-implemented system for playing alternative content in audio-video stream, the system comprising:

at least one processor;

memory in communication with the at least one processor;

software code stored in the memory, which when executed at one or more processors of the at least one processor causes the system to:

receive, from a content system by way of a network, a first manifest data structure containing a plurality of data entries identifying a plurality of content segments of an audio-video stream;

initiate streaming of at least one of said plurality of content segments of said audio-video stream;

receive, from said content system by way of said network, an indicator of availability of alternative content corresponding to one or more portions of a program, wherein the one or more portions are of particular interest to an end user;

send, to said content system by way of said network, a request for said alternative content during said streaming of said at least one of said plurality of content segments of said audio-video stream;

receive, from said content system by way of said network, a second manifest data structure reflective of removal from said first manifest data structure at least one of said data entries identifying those of said plurality of content segments that are not indicated by said one of said alternative content indicators as being an alternative content segment, the second manifest data structure retaining those of said data entries identifying a subset of said plurality of content segments which contain alternative content corresponding to said portions of said program of particular interest to said end user; and interrupt said streaming of said at least one said plurality content segments and initiating stream of at least one of said subset of said plurality of content segments which contain alternative content present in an unmodified manifest data structure and retained in said modified manifest data structure.

* * * * *